Patented Jan. 21, 1947

2,414,712

UNITED STATES PATENT OFFICE 2,414,712

METHODS OF PREPARING MODIFIED DEHYDRATED CASTOR OIL PRODUCTS

Don Sheldon Bolley, Brooklyn, N. Y.

No Drawing. Application July 16, 1942,
Serial No. 451,226

11 Claims. (Cl. 260—405)

This invention relates to liquid products containing modified dehydrated castor oil and to methods for producing the same.

The dehydration of castor oil (substantially the triglyceride of ricinoleic acid) results in the formation of conjugated and non-conjugated diene compounds. Whether or not the diene is conjugated or non-conjugated depends upon the position taken by the double linkage produced by the splitting-off of a water molecule from the ricinoleic acid radical. Thus, ricinoleic acid

HOOC—(CH₂)₇—CH=CH—CH₂—
           CH(OH)—CH₂—(CH₂)₄—CH₃ minus H₂O gives conjugated

HOOC—(CH₂)₇—CH=CH—CH=
           CH—CH₂—(CH₂)₄—CH₃ or non-conjugated

HOOC—(CH₂)₇—CH=CH—
           CH₂—CH=CH—(CH₂)₄—CH₃

Dehydrated castor oil, having in common with drying oil two unsaturated linkages and being also possessed of drying properties, is presently enjoying an increasing use in the preparation of oleo film-forming compositions. In order to improve the usefulness of drying oils generally, including dehydrated castor oil, such oils have been combined with other organic compounds, e. g., maleic anhydride, which are capable of joining on to the acid radicals of the drying oil molecule at the unsaturated linkages. It has been observed that this combination can more easily be effected at the conjugated unsaturated linkages than at the non-conjugated linkages.

According to the present invention, it is possible to obtain useful liquid products containing modified dehydrated castor oil wherein the conjugated linkages of the dehydrated castor oil are first combined with the maleic compound and subsequently, if additional maleic compound is present, also the non-conjugated linkages, as will hereinafter be described. The present invention is particularly adapted to the combination of maleic anhydride with dehydrated castor oil because it has been found that when above only a small amount, generally about 6–7%, of maleic anhydride has been combined with dehydrated castor oil, the reaction products are semi-solid gels. The present invention permits the combination of larger amounts of maleic anhydride with dehydrated castor oil while avoiding gel formation.

By "maleic compound" as used in the description of the present invention and in the claims appended hereto, is meant maleic acid, maleic anhydride, the esters and salts of maleic acid and the substitution products of maleic acid, maleic anhydride and maleic salts and esters. The following table of formulae illustrates the various types of maleic compounds contemplated.

Table 1

| Alpha unsaturated compound | Type formula | | Example | |
|---|---|---|---|---|
| Acid | | | Maleic acid | HC.COOH<br>‖<br>HC.COOH |
| Anhydride | | | Maleic anhydride | HC.CO<br>‖   \O<br>HC.CO/ |
| Ester | Monoester | HC.COO.R<br>‖<br>HC.COOH | Monoethyl ester | HC.COOC₂H₅<br>‖<br>HC.COOH |
|  | Diester | HC.COOR<br>‖<br>HC.COOR' | (Where R and R' represent organic radicals) | Diethyl ester | HC.COOC₂H₅<br>‖<br>HC.COOC₂H₅ |
| Salts | | HC.COOM<br>‖<br>HC.COOH | Monoammonium salt | HC.COONH₄<br>‖<br>HC.COOH |
|  | | HC.COOM<br>‖<br>HC.COOM' | (Where M and M' represent inorganic radicals) | Diammonium salt | HC.COONH₄<br>‖<br>HC.COONH₄ |
| Substitution products | | R.C.COOH<br>‖<br>H.C.COOH | Methyl maleic acid | CH₃.C.COOH<br>‖<br>H—C.COOH |
|  | | R.C.COOH<br>‖<br>R'C.COOH | (Where R and R' represent organic radicals) | Di-methyl maleic acid | CH₃.C.COOH<br>‖<br>CH₃.C.COOH |

The maleic compounds contemplated by the present invention when heated with dehydrated castor oil first combine preferentially with the conjugated linkages of this oil and subsequently at more elevated temperatures at the non-conjugated linkages.

The principal object of the present invention is, therefore, the preparation of liquid products containing dehydrated castor oil modified by combination with maleic compounds which liquid products are particularly adapted to the manufacture of film-forming compositions. This and other objects will appear from the description of the present invention.

In its broadest aspect the present invention contemplates reacting dehydrated castor oil with a maleic compound in a liquid medium in which the dehydrated castor oil, the maleic compound and the product of the reaction are miscible or soluble and which is, itself, soluble in or miscible with oleo- and oleo-resinous film-forming materials. In the claims appended hereto the terms "soluble" and "miscible" and the terms "solubility" and "miscibility" are used analogously. It will be understood thereby that these terms are used with reference to the formation of homogeneous compositions which do not exhibit a tendency to separate into their components. Into this category fall the non-conjugated fatty oils, such as linseed oil, soybean oil, cottonseed oil, corn oil, etc., the liquid condensation products of lower molecular weight mono-, di-, and polyhydric alcohols and high molecular weight monobasic fatty acids, e. g., the methyl ester of dehydrated castor oil fatty acids, the pentaerythritol ester of linseed oil fatty acids etc.

In carrying out the present invention the dehydrated castor oil, the maleic compound and the liquid medium may be mixed together and the reaction carried out from the beginning in the liquid medium. Alternatively, if desired, the maleic compound and the dehydrated castor oil may be mixed together and reaction started prior to the admixture of the liquid medium. When proceeding according to the latter method and using maleic anhydride the liquid media may be added any time before the commencement of gel formation. However, in this case considerable caution and control over time and temperature conditions have to be exercised in order to prevent gel formation. Hence, for practical purposes, it is preferable to carry out the invention by admixing all starting materials prior to starting the reaction.

It has been found that in the presence of a liquid medium as contemplated by the present invention, reaction of the conjugated portion with a maleic compound, for instance, maleic anhydride, begins at a relatively low temperature, about 110–120° C. and proceeds evenly without any substantial reaction of the non-conjugated portions up to about 200° C. when reaction with the non-conjugated portions begins. Above 200° C. the reaction with the non-conjugated portions is accelerated. A convenient temperature for carrying out combination of only the conjugated portion is about 150° C., plus or minus about 10° C. Because the rate of reaction tends to diminish as the maleic compound is used up it is often desirable to start the reaction and carry it along near to completion at about 150° C. and then to complete the reaction by raising the temperature to near 200° C. When it is desired to combine both the conjugated and non-conjugated portions of the dehydrated castor oil with the maleic compound, it is preferable first to combine the conjugated portions at a temperature below 200° C. and to complete the combination of the non-conjugated portions at a temperature about 200° C. or above. It should not be necessary in order to effect the latter combination to exceed about 300° C.

The invention permits the combination of any desired amount of maleic compound up to the complete elimination of unsaturated linkages of the dehydrated castor oil and liquid medium if an unsaturated fatty oil is used as such. When maleic anhydride is employed in the practice of the invention, the theoretical stoichiometric quantity is about 33% by weight based upon the weight of the unsaturated constituents of the reaction mixture. For practical purposes the upper limit for the amount of maleic anhydride to be used should be somewhat below the theoretical stoichiometric quantity, say about 25%, based upon the weight of unsaturated constituents present in the reaction mixture. For the preparation of commercially useful compositions, it is preferable to combine upwards of about 1 percent of maleic anhydride based on the weight of the unsaturated constituents of the reaction mixture. Amounts of maleic anhydride between about 5 percent and about 20 percent based on the weight of unsaturated constituents of the reaction mixture have been found preferable for most commercial applications of the invention, and 10 percent gives very desirable products. It will be understood that when a maleic compound other than maleic anhydride is employed, the amount to be used can be determined by calculating the same as maleic anhydride. Furthermore, it will be understood that when the reaction mixture contains dehydrated castor oil as the sole unsaturated constituent, the amount of maleic compound to be employed is calculated on this constituent only, but when there is present in addition to the dehydrated castor oil an unsaturated fatty oil as the liquid medium, the proportion of maleic compound may be based upon the combined weight of the dehydrated castor oil and the unsaturated fatty oil.

The amount of liquid medium to be employed may vary within wide limits without departing from the scope of the invention. When combining dehydrated castor oil with about 10 percent of its weight with maleic anhydride (an amount which in the absence of a liquid medium would produce a gel-like mass) as little as about 15% of liquid medium up to an equal amount of dehydrated castor oil may be employed. When larger amounts of maleic compound are used, generally speaking the amount of liquid medium should be increased. However, this is not a hard and fast rule of the invention. Inasmuch as liquidity is controlled by the amount of liquid medium employed, as much excess to produce any degree of desired viscosity may be used. The essential condition to be observed is that a sufficient amount of liquid medium should be used as is required for the particular proportions of dehydrated castor oil and maleic compound employed. This amount will vary, as will be appreciated, for each individual liquid depending upon the solubility of the dehydrated castor oil, maleic compound and reaction product in the particular solvent and those to whom this invention is addressed will readily be able to determine by means of a relatively few small scale controlled tests the minimum amount of liquid medium to be employed.

The invention also contemplates the combination of maleic compound with the unsaturated linkages of the liquid solvent medium when employing unsaturated fatty oils as such mediums. For instance, using linseed oil which is a non-conjugated unsaturated oil, the maleic compound will combine with this oil as well as with the conjugated and non-conjugated portions of the dehydrated castor oil when the reaction mixture is heated about 200° C. or over. When it is desired to combine only the conjugated portion of the dehydrated castor oil using a non-conjugated fatty oil as the liquid medium, the reaction temperature should be maintained below 200° C., or a completely unreactive medium should be employed. Thus, it is possible, according to the invention, to prepare liquid products containing modified castor oil of several types:

(a) Those in which only the conjugated portion of the dehydrated castor oil is combined with the maleic compound;

(b) Those in which both the conjugated and non-conjugated portions of the dehydrated castor oil are combined with the maleic compound but no combination with the liquid medium is effected;

(c) Those in which the conjugated and non-conjugated portions of dehydrated castor oil and unsaturated fatty oil liquid medium are combined with the maleic compound.

The combination should be carried out until the maleic compound is substantially completely combined. The course of the reaction and its completion may be observed by employing well-known analytical methods. As the reaction proceeds the free maleic compound in the reaction mixture progressively decreases and a determination of the amount of free maleic compound furnishes a convenient method for establishing the end point. When the maleic compound is maleic acid or maleic anhydride, a convenient method for following the course of the reaction to completion is to withdraw, from time to time, samples of the reaction mixture, leach the samples several times with hot water and to titrate the leach water with standardized alkali solution. When the leach water is substantially free from acidity, the action may be regarded as substantially complete. It will be understood that the higher the temperature at which the reaction is carried out, the quicker it is completed. Therefore, time is not an essential factor to complete the combination, except as relating to temperature.

The products of the invention are useful without further treatment as wetting agents in the grinding of pigments in oil and as an agent for producing better levelling and flow characteristics in paints.

When the products of the invention contain acid- or anhydride-groups as will be the case when using maleic acid or maleic anhydride or their substitution products, these products may be esterified by means of a polyhydric alcohol, such as glycerol, ethylene glycol, etc. to form oil-soluble, synthetic resins of the alkyd type which are useful in the preparation of film-forming compositions.

In addition, good water paint bases may be made from the primary products of the invention when these contain acid or anhydride radicals, by neutralizing such radicals with, for example, ammonia, water soluble amines, as such or in water solution, and the alkali metals and after neutralization, dispersing the neutralized product in water and admixing it with suitable pigments and driers. Water-soluble varnishes may be prepared in the same manner by omitting the pigment from the formulation. Small amounts of butyl alcohol added to these compositions aid in producing a more uniform film. Alternatively, a part, say about one-half of the acid or anhydride radicals of the maleic compound-dehydrated castor oil complex, when prepared from maleic acid or anhydride, may be esterified with a lower monohydric alcohol to form the half ester, which, when the remaining portion of the free acid or anhydride radicals are neutralized as above described, constitute excellent bases for water varnishes and paints.

The invention is illustrated but not limited by the following specificial examples:

Example I

A mixture of 20 parts of maleic anhydride, 90 parts of dehydrated castor oil and 90 parts of an alkali refined linseed oil was rapidly heated to 150° C. in a suitable vessel, then from 150° to 200° C. in 30 minutes and held at 200° C. for one hour. After cooling, the product was found to be a soluble viscous oil.

Example II 400 grams of dehydrated castor oil, 400 grams of an alkali-refined linseed oil and 200 grams of maleic anhydride were mixed together and the mixture placed in a 2 liter three-necked flask. The flask was equipped with means for stirring, a thermometer, an air condenser and means for passing carbon dioxide through the reaction mixture. The reaction mixture was heated to 150° C. in 15 minutes, from 150° to 200° C. in 30 minutes, it was held at 200° C. for 60 minutes and then heated up to 230° C. in 30 minutes, held at 230° C. for 150 minutes and then heated up to 250° C. in 30 minutes. When cooled the product was found to be a very heavy amber colored liquid. Analysis showed that only 0.16% of the maleic anhydride employed was unreacted indicating a practically complete compound.

It is to be understood that the foregoing description and examples of my invention have been given merely for illustrative and not limitative purposes. Therefore, it will be appreciated that there is no intention of excluding from the scope of my invention such changes and modifications as may be accomplished by the mere skill of the art.

I claim:

1. Method for forming liquid products containing modified, dehydrated castor oil which comprises mixing together dehydrated castor oil, a "maleic compound" and a non-conjugated liquid fatty oil, the amount of "maleic compound" calculated as maleic anhydride being between about 5.0% and about 25% based upon the weight of unsaturated constituents of the reaction mixture, and the amount of said non-conjugated liquid fatty oil being sufficient to maintain liquidity, and heating said mixture at temperatures between about 110° C. and about 300° C. until the "maleic compound" is chemically combined.

2. Method according to claim 1 wherein the liquid employed is a non-conjugated unsaturated fatty oil.

3. Method for forming liquid, modified dehydrated castor oil products which comprises mixing together dehydrated castor oil, and a "maleic compound," the amount of "maleic compound" calculated as maleic anhydride being between about 5.0% and about 25% of the weight of dehydrated castor oil, heating the mixture at temperatures between about 110° C. and 300° C. partially to combine the "maleic compound" with the dehydrated castor oil and, while the partial combination of "maleic compound" and dehydrated castor oil is still liquid, adding thereto a sufficient amount of a non-conjugated liquid fatty oil to maintain liquidity and continuing the heating to complete the chemical combination of "maleic compound."

4. Method for forming liquid, modified dehydrated castor oil products which comprises mixing together dehydrated castor oil, a "maleic compound" and a non-conjugated liquid fatty oil, the amount of "maleic compound" calculated as maleic anhydride being between about 5.0% and about 25% based upon the weight of the conjugated unsaturated constituents of the reaction mixture, and the amount of said non-conjugated liquid fatty oil being sufficient to maintain liquidity, and heating said mixture at temperatures between about 110° C. and about 200° C. until the "maleic compound" is chemically combined.

5. Method according to claim 4 wherein the liquid employed is a non-conjugated unsaturated fatty oil.

6. Method according to claim 4 wherein the liquid employed is linseed oil.

7. Method according to claim 4 wherein the "maleic compound" employed is maleic anhydride.

8. Method according to claim 4 wherein the "maleic compound" employed is maleic anhydride and the liquid is linseed oil.

9. Method for forming liquid, modified dehydrated castor oil products which comprises mixing together dehydrated castor oil, a "maleic compound" and a non-conjugated liquid fatty oil, the amount of "maleic compound" calculated as maleic anhydride being between about 5.0% and about 25% based upon the weight of the unsaturated constituents of the reaction mixture and the amount of said non-conjugated liquid fatty oil being sufficient to maintain liquidity, and heating the mixture at temperatures between about 110° C. and about 200° C. partially to combine the "maleic compound" and raising the temperature to about 300° C. to complete the combination.

10. Method for forming liquid, modified dehydrated castor oil products which comprises mixing together dehydrated castor oil, a "maleic compound" and a non-conjugated liquid fatty oil, the amount of "maleic compound" calculated as maleic anhydride being between about 5.0% and about 25% based upon the weight of the conjugated unsaturated constituents of the reaction mixture and the amount of said non-conjugated liquid fatty oil being sufficient to maintain liquidity, and heating the mixture at temperatures between about 110° C. and about 150° C. partially to combine the "maleic compound" and raising the temperature to about 200° C. to complete the combination.

11. Method for forming liquid, modified dehydrated castor oil products which comprises mixing together dehydrated castor oil, maleic anhydride and linseed oil, the amount of maleic anhydride being between about 7.0% and 20% of the weight of the oils and the amount of linseed oil being sufficient to main liquidity, and heating the mixture at temperatures between about 110° C. and about 200° C. to combine the maleic anhydride.

DON S. BOLLEY.